United States Patent
Vachuska

(10) Patent No.: US 8,386,494 B2
(45) Date of Patent: Feb. 26, 2013

(54) PROVIDING DATA STRUCTURES FOR DETERMINING WHETHER KEYS OF AN INDEX ARE PRESENT IN A STORAGE SYSTEM

(75) Inventor: Thomas Vachuska, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

(21) Appl. No.: 13/057,930

(22) PCT Filed: Aug. 7, 2008

(86) PCT No.: PCT/US2008/072400
§ 371 (c)(1),
(2), (4) Date: Feb. 7, 2011

(87) PCT Pub. No.: WO2010/016840
PCT Pub. Date: Feb. 11, 2010

(65) Prior Publication Data
US 2011/0145188 A1 Jun. 16, 2011

(51) Int. Cl.
G06F 17/30 (2006.01)
(52) U.S. Cl. ........ 707/741; 707/745; 707/796; 707/800
(58) Field of Classification Search .................. 707/610, 707/741, 745, 796, 800
See application file for complete search history.

(56) References Cited

U.S. PATENT DOCUMENTS

| | | | |
|---|---|---|---|
| 5,857,207 A * | 1/1999 | Lo et al. ............................... 1/1 |
| 5,970,496 A | 10/1999 | Katzenberger |
| 6,128,623 A | 10/2000 | Mattis et al. |
| 7,281,006 B2 * | 10/2007 | Hsu et al. ...................... 707/698 |
| 7,653,670 B2 * | 1/2010 | Hasan et al. ........... 707/999.205 |
| 2003/0182291 A1* | 9/2003 | Kurupati et al. .............. 707/100 |
| 2007/0250521 A1* | 10/2007 | Kaminski, Jr. ................ 707/101 |
| 2008/0256326 A1* | 10/2008 | Patterson et al. ............. 711/206 |
| 2008/0313218 A1* | 12/2008 | Takahashi ..................... 707/102 |
| 2011/0072291 A1* | 3/2011 | Murase ......................... 713/324 |
| 2011/0218969 A1* | 9/2011 | Anglin et al. ................. 707/679 |
| 2012/0089578 A1* | 4/2012 | Lam ............................. 707/692 |

* cited by examiner

Primary Examiner — Debbie Le

(57) ABSTRACT

Keys of an index are associated with corresponding data chunks in a storage system. In response to a request for a particular key, a particular location is accessed in a first data structure which is maintained in a first storage using a first portion of the particular key. In response to the particular location containing a first value, indicating that the particular key is not present in the index. In response to the particular location containing a second value, a map is accessed using a second portion of the particular key to retrieve an entry in a second data structure maintained in a second storage. The second data structure provides a collision chain to link entries of the second data structure that share a common value of the second portion of the particular key. The first data structure, map, and second data structure are part of the index.

21 Claims, 3 Drawing Sheets

PROVIDING DATA STRUCTURES FOR DETERMINING WHETHER KEYS OF AN INDEX ARE PRESENT IN A STORAGE SYSTEM

BACKGROUND

An enterprise (such as a company, educational organization, government agency, etc.) can maintain one or more storage servers that can store various types of data objects, such as text files, image files, video files, audio files, and/or other types of data. There can be potentially large amounts of duplicative data kept in the storage server(s) of the enterprise, which is wasteful of the storage capacity of the one or more storage servers.

In one example, duplicative data can result from repeated changes made to various files that are maintained as separate versions in the one or more storage servers. Although the different versions of the files are not identical, they still share a lot of common data.

A technique that has been used to reduce storage of duplicative data is to divide data objects into chunks, with a mechanism provided to ensure that certain duplicative chunks are not stored. In the above example, the common chunks shared by the different versions of the files can be stored just once, instead of multiple times in the different files.

An index of keys associated with the data chunks can be maintained to track whether a particular data chunk has already been stored in the storage system. The keys of the index can be hashes computed based on the data chunks. If a particular key is present in the index, then that is an indication that the corresponding data chunk is stored, with high probability, in the storage system.

An issue associated with maintaining an index is that, as the index becomes very large, memory space can run out. As a result, part of the index would have to be stored in slower secondary storage, which can result in thrashing between the memory and secondary storage (in which parts of the index are repeatedly swapped between the memory and secondary storage). Thrashing can slow down performance of the storage server(s).

BRIEF DESCRIPTION OF THE DRAWINGS

Some embodiments of the invention are described with respect to the following figures.

DETAILED DESCRIPTION

Figure 1:
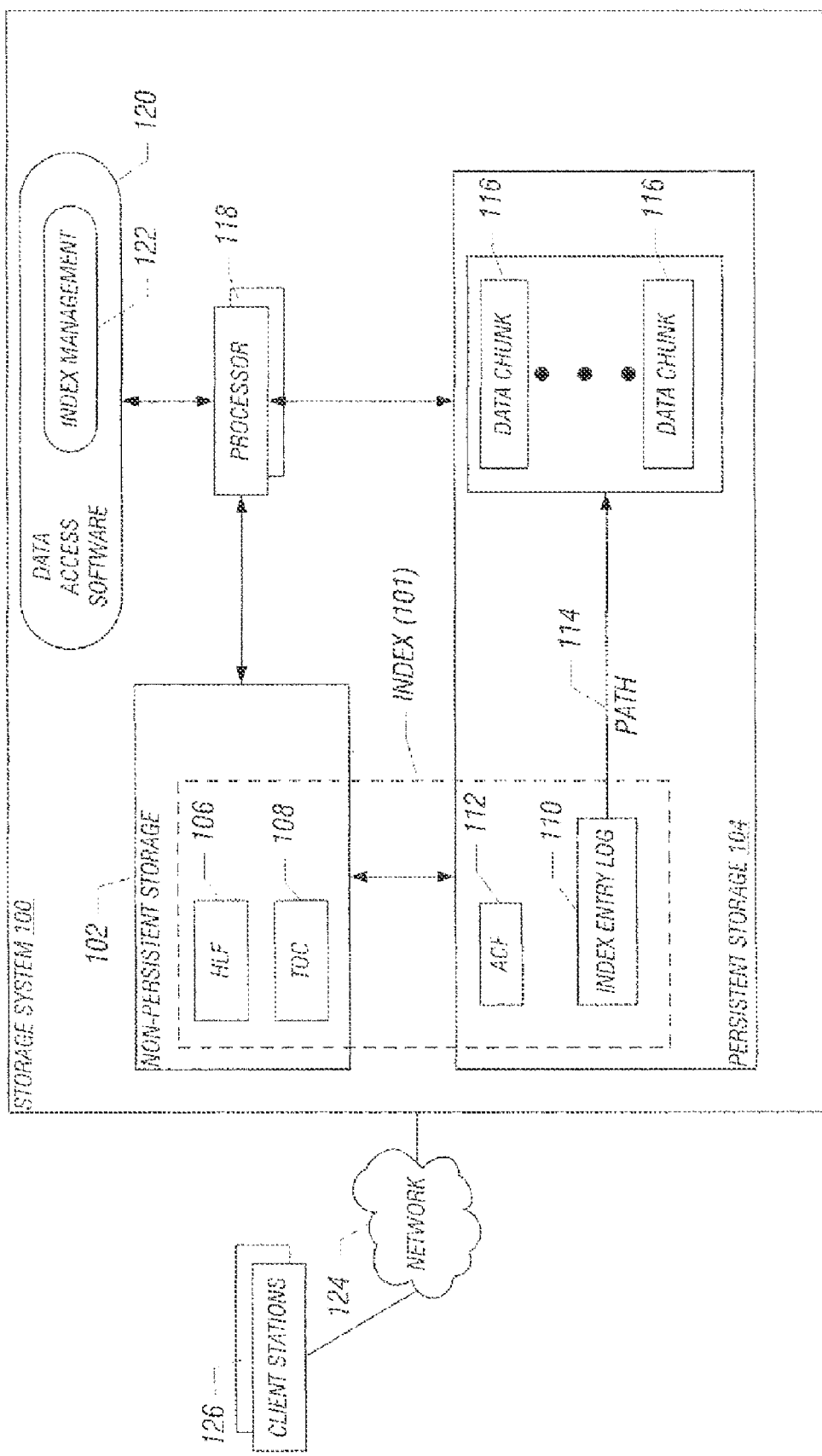
FIG. 1 is a block diagram of an exemplary arrangement of a storage system in which an index according to some embodiments is maintained.

In accordance with some embodiments, an index that enables efficient data access is maintained for data chunks that are stored in a storage system. A "storage system" can refer to a single storage server, for example, or to a collection (e.g., a network, an array, etc.) of storage servers, or to any other collection of storage devices. A "chunk" of data refers to any portion (less than the entirety or the entirety) of a data object, such as a text file, image file, video file, audio file, or other type of data object. The storage system stores data chunks that have been subdivided from the original data objects, and further stores the index according to some embodiments to enable efficient access of such data chunks.

The index according to some embodiments includes a first data structure to enable a relatively quick response if a particular key that is being requested is not present in the index (query for a nonexistent key). A query is a request submitted by a client (e.g., application software, remote computer, etc.) that seeks to access (read or write) a particular data chunk (or group of data chunks). Corresponding key(s) are then generated in response to such query for the data chunk(s), and the key(s) are used to perform a lookup into the index for determining whether or not the key(s) are present in the index. A "key" refers to a value that is generated for a corresponding data chunk that is likely unique for different data chunks. For example, the generated value can be a hash value produced by applying a hash function to the content of the data chunk. The presence of a key in the index (positive lookup) is an indication that the corresponding data chunk is stored, with a high probability, in the storage system. Absence of a key in the index (negative lookup) is an indication that the corresponding data chunk is not stored in the storage system.

The index associates each key in the index with corresponding path information that identifies a location of the corresponding data chunk. The path information can be in the form of a directory path name, a uniform resource locator, or any other identifier of a location of the data chunk. In response to a query, the path information associated with a key in the index can be used to retrieve the corresponding data chunk stored in a storage system.

In addition to providing quick responses for negative lookups (queries for nonexistent keys), the index according to some embodiments also allows for key inserts into the index to be relatively fast and efficient. In addition, mechanisms are incorporated into the index to reduce the amount of input/output (I/O) accesses of secondary storage (e.g., disk-based storage) when a positive lookup occurs (a positive lookup is an indication that the requested key may be located in the index). Such mechanisms employ one or more data structures that can be used to more quickly locate the matching entry of the index or to more quickly ascertain that the requested key in fact is not present in the index.

FIG. 1 illustrates an exemplary arrangement that includes a storage system 100 that has a non-persistent storage 102 and a persistent storage 104. The non-persistent storage 102 can be implemented with relatively fast storage devices such as dynamic random access memories (DRAMs), static random access memories (SRAMs), and/or other types of memories. The persistent storage 104 can be the secondary storage of the storage system 100, and can include disk-based storage devices (e.g., magnetic disk-based storage devices or optical disk-based storage devices). The persistent storage 104 is able to maintain the data stored on the persistent storage 104 even after system power is removed from the persistent storage 104. On the other hand, the non-persistent storage 102 loses data contained in the non-persistent storage when power is removed from the non-persistent storage 102.

As depicted in FIG. 1, an index 101 is implemented on both the non-persistent storage 102 and the persistent storage 104. The index 101 include various data structures, including a hash lookup filter (HLF) 106, a table of contents (TOC) 108, an index entry log 110, and an accelerator cache file (ACF) 112. In the ensuing discussion, reference is made to the HLF, TOC, ACF, and index entry log. However, note that the names used for these data structures are provided for purposes of example only, as different names can be assigned to similar data structures in other implementations.

In response to a query for a particular key, the HLF 106 is the first data structure that is accessed to determine whether or not the particular key is in the index 101 (and therefore, whether or not the corresponding data chunk is stored in the storage system 100). In some embodiments, a first portion of the particular key (e.g., 32 bits of the particular key) are used to access an entry in the HLF 106. The accessed entry in the HLF 106 can be made up of a single bit or collection of bits. The accessed entry in the HLF 106 returns a first value if the particular key is not in the index. The accessed entry in the HLF 106 returns a second value if the particular key may be located in the index.

In one implementation, the HLF 106 is a Bloom filter, which is a probabilistic data structure used to test whether an element is a member of a set. False positives are possible, but false negatives are not. Thus, a negative response that indicates that the particular key is not present in the index (the first value returned from the HLF 106) is an indication that the particular key is definitely not in the index 101. However, a positive response (second value returned by the HLF 106) is merely an indication that the particular key is possibly in the index 101 (however, it is also possible that the particular key is not in the index 101).

In one embodiment, the HLF 106 can be implemented as a linear space of bits (entries), where each bit is accessed in response to a corresponding value of the first portion of the key. This accessed bit returns a "0" if the requested key is not in the index 101, and returns a "1" if the requested key is possibly in the index.

In one implementation, a hash function applied to a data chunk for generating a key is a secure hash algorithm (SHA) hash function, which can provide 256 or 512-bit hashes to use as the keys. Since the hits of an SHA hash are mixed uniformly, the actual bits of each hash, rather than an additional hash function, can be used to address the HLF 106. In other implementations, other types of hash functions can be used.

The TOC 108 is basically a map that is accessed when the HLF 106 returns a positive response for a requested key. A second portion (e.g., 27, bits) of the requested key is used to access an entry of the TOC 108. The TOC 108 can be implemented as a table of slots, where each slot is accessed by a corresponding value of the second portion of the requested key. Each slot of the TOC 108 contains index record offsets to entries of the index entry log 110 that is stored in the persistent storage 104. An index record offset identifies a location of the TOC 108.

The index entry log 110 contains multiple entries, where each entry includes the following fields: a key field, a field containing a path to a data chunk associated with the key, a predecessor field, and an embedded key filter field. The predecessor fields of a group of entries of the index entry log 110 can be linked together to form a backward-linked list of index entries in the index entry log 110 that are in the same collision domain. Note that only the second portion of the key is used to access a slot in the TOC 108. In some implementations, as noted above, the second portion of the key can be 27 bits of the key. There may be multiple index records that share the same 27-bit (second portion) value that is used to address the TOC 108. These index records that share the same value of the second portion are part of the same TOC collision chain, which are linked together in the index entry log 110 by the backward-linked list defined using the predecessor fields of the corresponding entries in the index entry log 110. In this manner, when determining whether a requested key is present in the index entry log 110, the backward-linked list associated with the particular second portion value can be traversed to quickly go to entries of the index entry log that correspond to the particular second portion value of the key that was used to address the TOC 108. The entries identified by the collision chain are iteratively accessed until a matching key is found, or until the end of the collision chain has been reached (without a matching key).

In accordance with some embodiments, to avoid repeated full traversals through collision chains provided by the index entry log 110, each entry of the index entry log 110 also maintains an embedded filter key that stores some portion (e.g., a byte) of other keys that are part of the same collision chain. Once a full traversal of the collision chain has been made, then an embedded key filter for the last (most recent) index record is built up, so that a subsequent query can retrieve the content of the embedded key filter to determine whether the corresponding byte of the requested key matches any of the bytes in the embedded key filter. If no match is found, then that is an indication that the requested key is not present in the index, so that a traversal through the collision chain (associated with I/O accesses of the persistent storage 104) does not have to be performed. This prevents repeated navigations through the same collision chains over and over again, which is expensive in terms of I/O accesses to a relatively slow persistent storage.

If a matching key is found in the index entry log 110, then a corresponding path 114 is returned to allow a location of a requested data chunk (116) to be identified so that the data chunk can be retrieved.

As depicted in FIG. 1, the index 101 also includes an accelerator cache file (ACF) 112, which is basically a persistent version of the combination of the HLF 106 and the TOC 108. The combination of the HLF 106 and TOC 108, which resides in the non-persistent storage 102, can be considered an accelerator cache. To avoid possible loss of index data, the accelerator cache containing the HLF 106 and TOC 108 is Synchronized to the ACF 112 stored in the persistent storage 104. During synchronization of the HLF and TOC to the ACF 112, insert and delete operations to the index 101 are suspended. Upon system restart, the in-memory structures HLF 106 and TOC 108 are initialized by reading the ACF 112.

The in-memory accelerator cache can be persisted in a double-buffered manner, which preserves the most recent valid copy until a new version is successfully written to the ACF 112. Synchronizing the accelerator cache to the ACF 112 can be performed periodically. Moreover, the ACF 112 can store a relatively small amount of additional management information to facilitate recovery of the latest accelerator cache state from the index entry log 110, in case of system crash. Various life-time index statistics can also be kept in the ACF 112.

The storage system 100 of FIG. 1 includes one or more processors 118. Data access software 120 is executable on the one or more processors 118 to access the index 101 and the data chunks 116. The data access software 120 includes an index management module 122 according to an embodiment for accessing and maintaining the index 101.

The storage system 100 can be connected over a network 124 to one or more remote client stations 126. The client stations 126 are able to issue queries to the storage system 100 to perform read or write accesses of data chunks 116. A write access may cause the content of the index 101 to change, such as due to a deletion, a new insertion, or an update.

Figure 2:
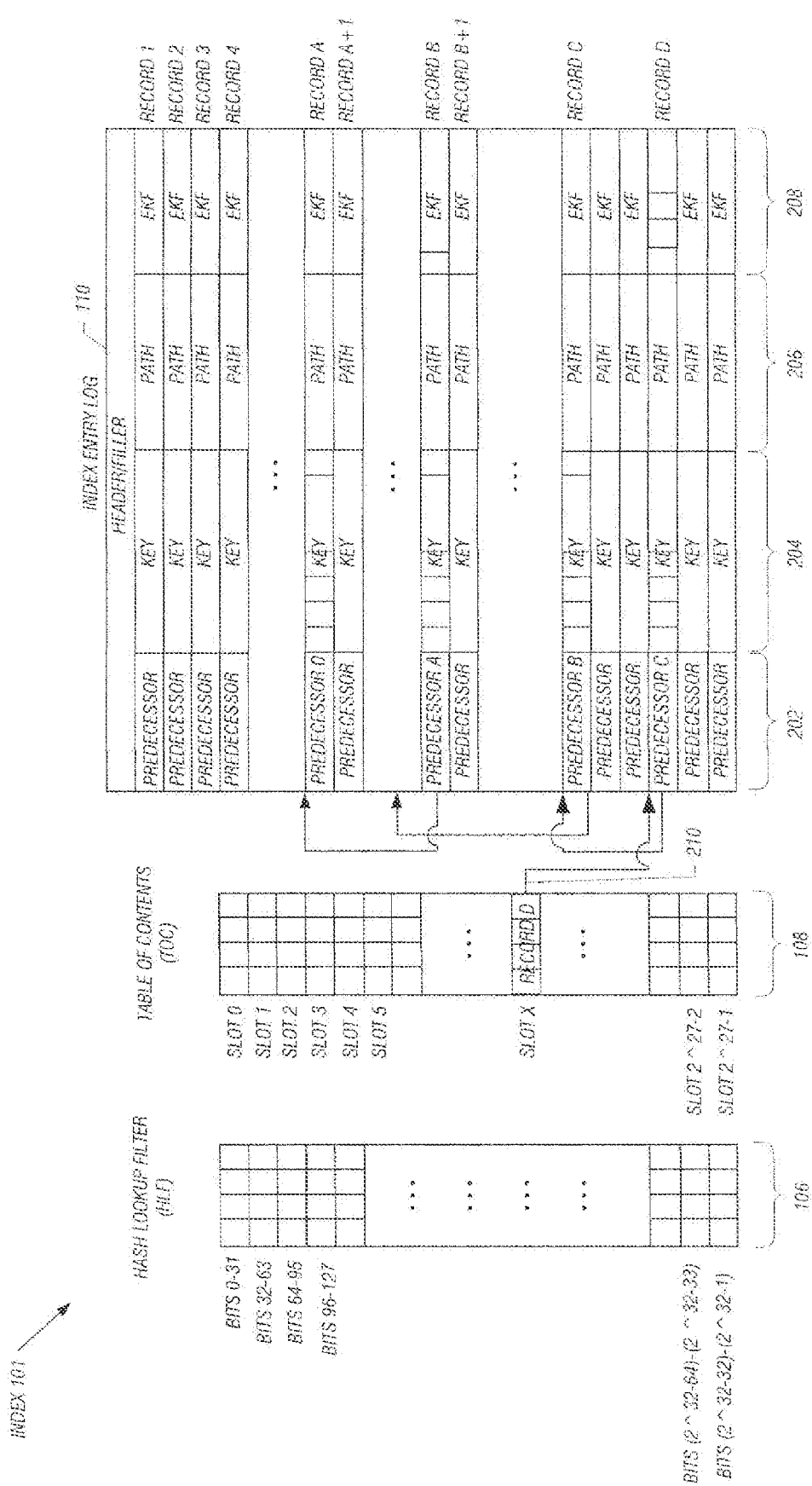
FIG. 2 is a schematic diagram of an exemplary index according to an embodiment.

FIG. 2 shows more details of an exemplary index 101, particularly details associated with the HLF 106, TOC 108, and index entry log 110. The HLF 106 (although shown in table format in FIG. 2) can actually be a linear array of bits, from bit 0 to $2^{32}-1$, assuming that 32 bits of a requested key are used to access an entry bit) of the HLF 106. In other examples, portions of other sizes of the requested key can be used for accessing an entry of the HLF 106. Assuming that 32 bits (first 32 bits, last 32 bits, or some other collection of 32 bits) of the requested key are used for accessing entries of the HLF 106, the HLF 106 goes from bit 0 through bit $2^{32}-1$. Each hit of the HLF, as accessed by the 32-bit portion of the requested key, can have either a "0" or "1" value. As noted above, a "0" value indicates that the index 101 definitely does not contain the requested key. On the other hand, a "1" value in the accessed entry of the HLF 106 indicates that the requested key potentially may be located in the index 101.

If a "0" value is returned from the HLF 106 in response to an access, then the other data structures of the index 101 are not accessed for further lookup. In this manner, a relatively quick negative lookup response can be provided, such that the requester can receive an indication that a requested key is not present in the index 101 relatively quickly (since the HLF 106 is located in memory).

However, if a "1" value is returned, indicating that the requested key is possibly located in the index 101, the access procedure next accesses the TOC 108 using another portion of the requested key as the address into the TOC 108. In one example, the portion of the requested key used to address the TOC 108 is 27 bits long. For example, it can be the first 27 bits, or some other 27 bits of the requested key.

A value of the 27 bits of the requested key is mapped into one of the slots of the TOC 108. The accessed slot, e.g., slot X, contains an index record offset into the index entry log 110. This index record offset (represented as 210 in FIG. 2) points to a record D in the index entry log 110. The entries (or records) of the index entry log 110 are added to the index entry log 110 in sequential manner. In other words, as new keys are added to the index 101, the corresponding record is added as the last entry of the index entry log 110. To insert a new record into the index entry log 110, a seek (assuming a disk-based persistent storage is used) is performed to the end of the index log file 110 and the new index entry record is written to the end of the index log file 110. In some embodiments, a batch insert mode can be used, in which multiple records are inserted as a batch operation such that a single seek is performed for inserting multiple records to the index entry log 110 (to reduce the number of seeks).

Each record of the index entry log 110 has a number of fields, including a predecessor field 202 (containing an offset to identify a predecessor record in the index entry log 110 that shares the same value of the 27 bits (same collision chain) of the requested key used for accessing the TOC 108); a key field 204 (for storing the index key); a path field 206 (for storing the path of the data chunk associated with the index key); and an embedded key filter (EKF) field 208 (for storing the embedded key filter that identifies small segments of other keys in the index entry log 110 that share the same 27-bit value (same collision chain) for accessing the TOC 108).

Note that each slot of the TOC 108 contains the index record offset of the most-recently written index entry that falls in the corresponding TOC slot collision chain (corresponding to a particular 27-bit value of a key). Older index records within the TOC collision chain, those which by definition share the same 27 hits used to address the TOC slot, are accessed by navigating to the previous record, whose offset is written in the predecessor field of each record. Thus, for example, the predecessor field of record D contains the index record offset to record C. In turn, the predecessor field for record C contains the index record offset to record B. The predecessor field for record B contains the index record offset for record A, and the predecessor field for record A is an invalid value to indicate that this is the end of the collision chain. The collision chain example (for a particular 27-bit value) depicted in FIG. 2 thus includes records D, C, B, and A. The values of the predecessor fields of these records form a backward-linked list that can be navigated to find all records that share the same 27-bit value of the requested key used to access the corresponding TOC slot (slot X in the example of FIG. 2).

Note that during insertion of a new record into the index entry log 110, the current TOC slot value is used to fill the predecessor field of the new record that is being inserted. After the record has been inserted into the index entry log 110, the TOC slot is updated with the index record offset of the new record that was inserted into the index entry log 110. In this manner, the TOC slot continues to point to the end of the collision chain (the end containing the most recently inserted index record), and the insert is accomplished with a single write.

To avoid repeated navigations of collision chains, a supplementary key lookup mechanism is used, which involves the embedded key filter field 208. The embedded key filter field 208 of each record is constructed opportunistically, by keeping track of a small segment (e.g., last byte) of each encountered non-matching key. If a search for a requested key ended with a negative result (after navigating through the appropriate records of the index entry log 110), then the new record that is to be added to the index entry log 110 would contain the embedded key filter field 208 initialized with the last bytes of keys in the collision chain. Any subsequent access that retrieves this record will first match the last byte of the requested key with the bytes contained in the embedded key filter field 208. If no match is detected, then that is an indication that the index entry log 110 does not contain the requested key, such that navigating through the collision chain would not have to be performed.

A deletion from the index 101 is performed by locating the affected record in the index entry log 110 and using its predecessor field to update its successor's predecessor field, thus essentially bypassing the affected record. In the example of FIG. 2, record C is a predecessor of record D in the collision chain, and record D is a successor of record C in the collision chain. If a key corresponding to record C (the affected record) is to be deleted, then the offset in the predecessor field of record C is used to update the predecessor field of successor record D. This update results in the offset of record B being written into the predecessor field of record D. As a result, the updated predecessor field of record D would point to record B, rather than deleted record C.

In other words, the successor's predecessor field would now point to the predecessor of the affected record, rather than to the affected record. In the event that the most recently inserted record in the collision chain is being deleted, then the corresponding TOC slot is updated with the predecessor field value of the deleted record. For example, if record D (the last record of the collision chain corresponding to slot X) is to be deleted, then the offset in the predecessor field of record D will be written to TOC slot X, such that TOC slot X will now point to record C instead of deleted record D.

An update of an index entry record can be performed by locating the desired record through a lookup operation and then writing an updated record image at its offset.

Following a certain number (predefined number) of deletions, compaction of the index may be warranted to boost the efficiency of the data structures in the index 101. Compaction can be accomplished by replaying the old index entry log 110, while writing a new one without the deleted records. Replaying the index entry log 110 refers to scanning through the index entry log 110 in sequence and re-creating the backward linked lists corresponding to the collision chains (without the deleted records) for insertion into the new log. The HLF 106 and TOC 108 are updated appropriately during this operation.

Since the insert/lookup/delete/synchronize operations are internally synchronized to guard against conflicting concurrent updates, an external locking mechanism does not have to be used.

Figure 3:
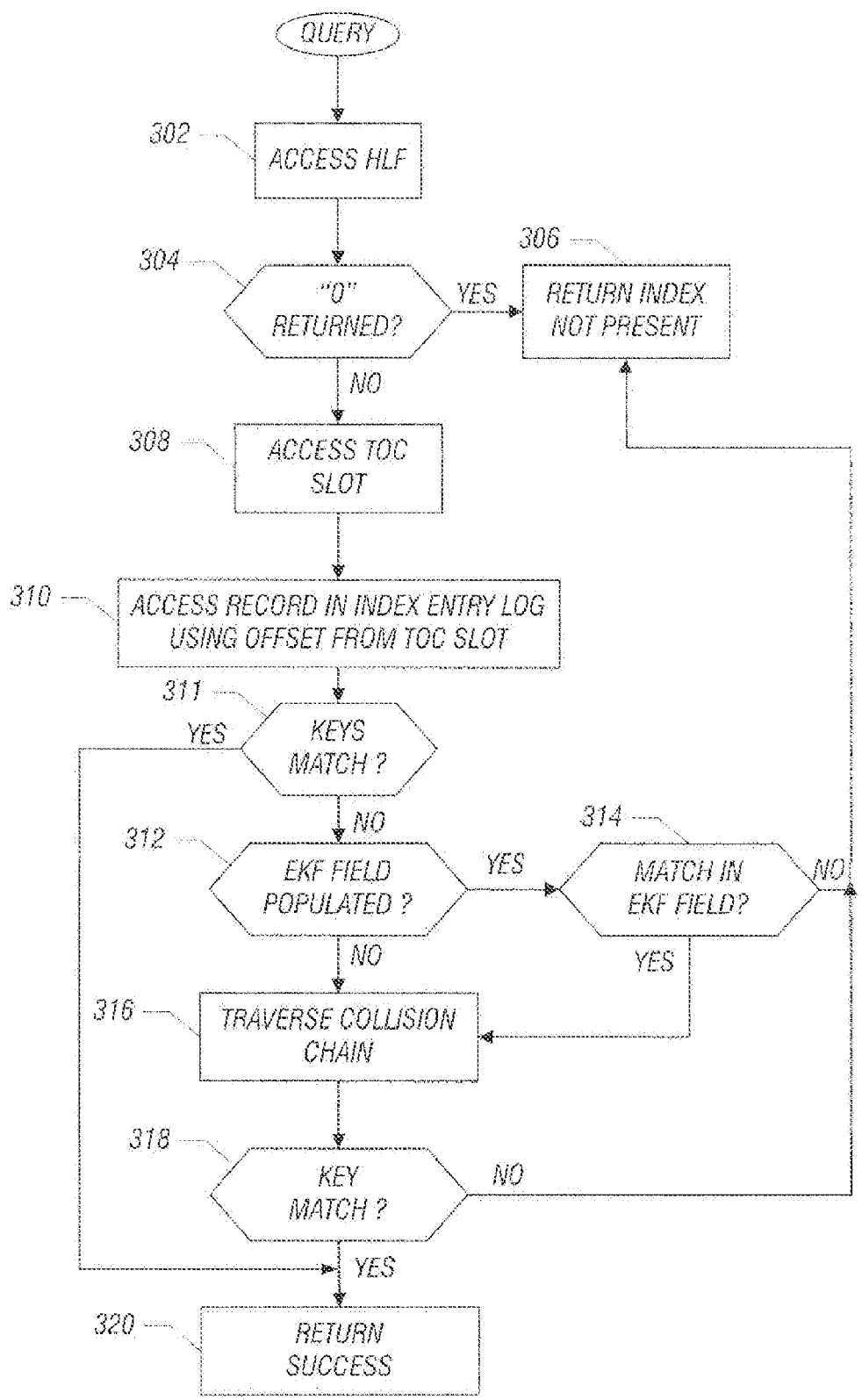
FIG. 3 is a flow diagram of a process for performing a read, in accordance with an embodiment.

FIG. 3 shows a procedure performed by the data access software 120 (FIG. 1) in response to a query that contains a particular index key. Using a first portion (e.g. first 32 bits) of the requested key, an entry of the HLF 106 is accessed (at 302). If the accessed entry of the HLF 106 returns a "0", as determined at 304, then an index not present indication is returned (at 306) to indicate that the requested key is not in the index 101.

However, if a value other than "0" is returned from the HLF 106, which indicates that the requested key is potentially in the index, then a TOC slot in the TOC 108 is accessed (at 308) using bits 5 through 32 (27 bits) of the requested key, for example. The index record offset contained in the accessed TOC slot is used to access (at 310) the corresponding record in the index entry log 110.

Next, it is determined (at 311) if the key contained in the accessed record of the index entry log 110 matches the requested key. If so, then a success is returned (at 320).

However, if the keys do not match, the data access software 120 next checks (at 312) to determine if the EKF field of the retrieved record is populated (to contain the last bytes of keys that are part of the collision chain). If so, the data access software 120 determines (at 314) if the last byte of the requested key matches any of the last bytes in the EKF field. If not, then that is an indication that the requested key is not present in the index, and the appropriate indication is returned (at 306). Note that this saves having to traverse through the entries of the collision chain, which is expensive in terms of I/O accesses.

However, if the determination at 314 indicates that the last byte of the requested key matches one of the bytes in the EKF field, then the collision chain is traversed (at 316). Note that the collision chain is also traversed in response to determining at 312 that the EKF field is not populated.

Next, in iteratively traversing through the collision chain, the data access software 120 determines (at 318) if the requested key matches the key in the latest retrieved record of the collision chain. If so, then a success is returned (at 320). If no key match is identified, then an index not present indication is returned (at 306).

Instructions of software described above (including data access software 120 and index management software 122 of FIG. 1) are loaded for execution on a processor (e.g., 118 in FIG. 1). The processor includes microprocessors, microcontrollers, processor modules or subsystems (including one or more microprocessors or microcontrollers), or other control or computing devices. As used here, a "processor" may refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
  associating keys of an index with corresponding data chunks in a storage system;
  in response to a request for a particular key, accessing, by a system having a processor, a particular location in a first data structure maintained in a first storage using a first portion of the particular key;
  in response to the particular location containing a first value, indicating, by the system, that the particular key is not present in the index; and
  in response to the particular location containing a second value, accessing, by the system, a map using a second portion of the particular key to retrieve an entry in a second data structure maintained in a second storage, wherein the second data structure provides a collision chain to link entries of the second data structure that share a common value of the second portion of the particular key,
  wherein the first data structure, map, and second data structure are part of the index.

2. The method of claim 1, further comprising:
  comparing the particular key to a key in the retrieved entry of the second data structure;
  in response to the comparing indicating a match of the keys, returning a success indication; and
  in response to the comparing indicating no match of the keys, traversing the collision chain to iteratively retrieve additional entries in the collision chain until it is determined that a key in a retrieved record matches the particular key.

3. The method of claim 2, further comprising:
  iteratively retrieving successive entries of the second data structure in the collision chain until a match to the particular key is found or until an end of the collision chain has been reached.

4. The method of claim 3, further comprising:
  storing, in each of at least some entries of the second data structure, a section that contains parts of keys of other entries linked by the collision chain.

5. The method of claim 4, further comprising:
  accessing the section of a retrieved one of the entries of the collision chain in response to a second request for the particular key to determine whether or not to iterate through the entries of the collision chain.

6. The method of claim 1, wherein the first storage is a non-persistent storage, and wherein accessing the map comprises accessing the map stored in the non-persistent storage.

7. The method of claim 6, wherein the second storage is a persistent storage, the method further comprising synchronizing content of the first data structure and the map with a persistent data structure stored in the persistent storage.

8. The method of claim 1, wherein an accessed portion of the map contains an offset into the second data structure, wherein retrieving the entry in the data structure is according to the offset.

9. The method of claim 8, further comprising:
updating a value of the offset in the accessed entry in response to an insert of a new entry into the second data structure that has a key that shares the common value of the second portion of the particular key.

10. The method of claim 8, further comprising:
updating a value of the offset in the accessed entry in response to deleting a key corresponding to an entry that is a most recent entry of the collision chain inserted into the second data structure.

11. The method of claim 1, further comprising:
providing predecessor fields in corresponding entries of the second data structure, wherein the collision chain is defined by predecessor fields of a group of entries of the second data structure.

12. The method of claim 11, wherein providing the collision chain comprises providing a backward-linked list using the predecessor fields of the group of entries.

13. The method of claim 1, wherein the first portion has a length less than a length of the particular key, and the second portion has a length less than the length of the particular key.

14. The method of claim 13, wherein the length of the first portion is different from the length of the second portion.

15. A storage system comprising:
a first storage to store a first data structure and a map that are part of an index;
a second storage to store a second data structure that is part of the index; and
a processor to:
receive a request for a particular key of the index;
in response to the request, access a particular location of the first data structure using a first portion of the particular key;
in response to the particular location containing a first value, indicate that the particular key is not present in the index; and
in response to the particular location containing a second value, access the map using a second portion of the particular key to retrieve an entry in the second data structure, wherein the second data structure contains entries each including a first field containing a corresponding key, and a second field containing segments of other keys contained in other entries of the second data structure.

16. The storage system of claim 15, wherein the processor is configured to, in response to the request for the particular key, access the second field of the retrieved entry in the second data structure to determine whether other entries in the first data structure possibly contain a key matching the particular key.

17. The storage system of claim 15, wherein the first portion has a length less than a length of the particular key, and the second portion has a length less than the length of the particular key.

18. The storage system of claim 17, wherein the length of the first portion is different from the length of the second portion.

19. An article comprising at least one computer-readable storage medium containing instructions that when executed cause a processor in a storage system to:
associate keys of an index with corresponding data chunks in a storage system;
in response to a request for a particular key, access a particular location in a first data structure maintained in non-persistent storage using a first portion of the particular key;
in response to the particular location containing a first value, indicate that the particular key is not present in the index; and
in response to the particular location containing a second value, access a map using a second portion of the particular key to retrieve an entry in a second data structure maintained in persistent storage, wherein the second data structure provides a collision chain to link entries of the second data structure that share a common value of the second portion of the particular key,
wherein the first data structure, map, and second data structure are part of the index.

20. The article of claim 19, wherein the first portion has a length less than a length of the particular key, and the second portion has a length less than the length of the particular key.

21. The article of claim 20, wherein the length of the first portion is different from the length of the second portion.

\* \* \* \* \*